US009682630B2

(12) United States Patent
Chupin et al.

(10) Patent No.: US 9,682,630 B2
(45) Date of Patent: Jun. 20, 2017

(54) METHOD FOR RECHARGING A BATTERY OF A HYBRID VEHICLE WHEN THE VEHICLE IS STATIONARY

(71) Applicant: RENAULT s.a.s., Boulogne-Billancourt (FR)

(72) Inventors: Paul-Eric Chupin, Rueil-Malmaison (FR); Frederic Auzas, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 301 days.

(21) Appl. No.: 14/405,968

(22) PCT Filed: Jun. 6, 2013

(86) PCT No.: PCT/FR2013/051282
§ 371 (c)(1),
(2) Date: Dec. 5, 2014

(87) PCT Pub. No.: WO2013/190205
PCT Pub. Date: Dec. 27, 2013

(65) Prior Publication Data
US 2015/0217652 A1    Aug. 6, 2015

(30) Foreign Application Priority Data

Jun. 20, 2012   (FR) ..................... 12 55782

(51) Int. Cl.
*B60L 11/18*    (2006.01)
*B60L 11/12*    (2006.01)
(Continued)

(52) U.S. Cl.
CPC ........... *B60L 11/1809* (2013.01); *B60L 11/14* (2013.01); *B60L 11/1862* (2013.01);
(Continued)

(58) Field of Classification Search
CPC   B60L 11/123; B60L 11/1838; B60L 11/1809; Y02T 90/167
(Continued)

(56) References Cited

U.S. PATENT DOCUMENTS 7,746,026 B2 *   6/2010   Koziara ............... B60L 3/0046
                                                320/104
8,169,186 B1 *   5/2012   Haddad ............... B60L 11/1835
                                                180/14.3
(Continued)

FOREIGN PATENT DOCUMENTS

DE   10 2010 044089 A1   5/2012
EP       2 423 027 A2    2/2012
EP       2 426 002 A1    3/2012

OTHER PUBLICATIONS

International Search Report issued Aug. 12, 2013 in PCT/FR2013/051282 filed Jun. 6, 2013.
(Continued)

*Primary Examiner* — Stacy Whitmore
(74) *Attorney, Agent, or Firm* — Oblon, McClelland, Maier & Neustadt, L.L.P.

(57) ABSTRACT

A method for controlling recharging of a battery of a hybrid vehicle when the vehicle is stationary, the vehicle including a heat engine and at least one electric machine that can simultaneously or independently generate movement of the vehicle in electric, thermal, and hybrid operating modes, according to rolling conditions and a state of charge of a traction battery providing a power supply of the electric machine. The recharging of the battery is activated when the vehicle is stationary, at request of a driver acting on a dedicated interface.

11 Claims, 3 Drawing Sheets

Figure 1:
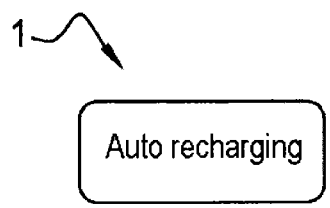

(51) Int. Cl.
- *B60W 50/14* (2012.01)
- *B60W 10/06* (2006.01)
- *B60W 10/26* (2006.01)
- *B60W 20/00* (2016.01)
- *B60W 30/18* (2012.01)
- *B60L 11/14* (2006.01)

(52) U.S. Cl.
CPC ............ *B60W 10/06* (2013.01); *B60W 10/26* (2013.01); *B60W 20/00* (2013.01); *B60W 30/18054* (2013.01); *B60W 50/14* (2013.01); *B60L 11/123* (2013.01); *B60L 11/1838* (2013.01); *B60L 2240/12* (2013.01); *B60L 2250/10* (2013.01); *B60L 2250/12* (2013.01); *B60L 2250/24* (2013.01); *B60L 2260/22* (2013.01); *B60W 2510/244* (2013.01); *B60W 2710/244* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 90/167* (2013.01)

(58) Field of Classification Search
USPC ........................................................ 320/104
See application file for complete search history.

(56) References Cited

U.S. PATENT DOCUMENTS

| | | | |
|---|---|---|---|
| 9,067,503 B2* | 6/2015 | Turner | G06Q 30/02 |
| 2001/0020789 A1* | 9/2001 | Nakashima | B60K 6/365 |
| | | | 290/40 C |
| 2009/0055330 A1* | 2/2009 | Medasani | G01R 31/3693 |
| | | | 706/2 |
| 2009/0108803 A1 | 4/2009 | Singarajan et al. | |
| 2010/0133900 A1* | 6/2010 | King | B60L 11/1816 |
| | | | 307/9.1 |
| 2010/0253289 A1* | 10/2010 | Amir | H02J 7/0063 |
| | | | 320/135 |
| 2011/0140660 A1 | 6/2011 | Potter | |
| 2011/0156657 A1* | 6/2011 | Anderson | H01M 10/44 |
| | | | 320/134 |
| 2012/0016551 A1* | 1/2012 | Krause | B60W 50/14 |
| | | | 701/32.3 |
| 2012/0049806 A1 | 3/2012 | Saito | |
| 2012/0262104 A1* | 10/2012 | Kirsch | H02J 7/0073 |
| | | | 320/101 |
| 2013/0038284 A1* | 2/2013 | LaFrance | B60L 11/1838 |
| | | | 320/109 |
| 2014/0347018 A1* | 11/2014 | Boblett | B60L 11/1838 |
| | | | 320/162 |

OTHER PUBLICATIONS

French Preliminary Search Report issued Mar. 6, 2013 in French Patent Application No. 1255782 filed Jun. 20, 2012.

* cited by examiner

METHOD FOR RECHARGING A BATTERY OF A HYBRID VEHICLE WHEN THE VEHICLE IS STATIONARY

The present invention relates to hybrid vehicles equipped with a hybrid powertrain, comprising a heat engine and at least one electric machine that can simultaneously or independently generate the movement of the vehicle in electric, thermal and hybrid operating modes, according to the driving conditions and the state of charge of a traction battery that supplies power to the electric machine.

More precisely, the invention relates to a method for controlling the recharging of a battery of a hybrid vehicle when the vehicle is stationary.

The primary field of application of this invention is constituted by a hybrid vehicle, in which the electric motor alone must ensure the traction of the vehicle in a launch or "move-off" phase from a stationary state and at low movement speeds, such that the powertrain only has available the electric energy stored in the batteries of the vehicle in order to ensure the launch and movement of the vehicle from a stationary state, until the heat engine is started. This is the case in some constructions in which, due to design, the heat engine can only contribute to the propulsion of the vehicle from a determined speed threshold. If the batteries are too weak to launch the vehicle in electric mode before the heat engine is started, it is possible to resort to a stationary recharging mode, referred to as "roadside recharging", with the aid of the heat engine functioning as a generator.

A method for managing the state of charge of the traction battery in a hybrid vehicle is known from publication EP 1 122 857, the object of said method being to ensure the start-up of the vehicle via the electric motor in the case in which the traction battery has a state of charge that is too weak to start up the electric motor and/or the heat engine. The proposed method uses the on-board battery of the vehicle, usually intended for the vehicle equipment, in order to charge the traction battery. However, this method does not make it possible to launch the vehicle at start-up with the aid of the electric motor alone, nor does it make it possible to start up the heat engine if the traction battery is too weak for this.

The object of the present invention is to manage the use of the two energy sources of a hybrid vehicle, specifically the battery and the fuel load present in the tank, by taking into account user needs and anticipations.

With this object, the invention proposes that the start-up of the vehicle is refused without prior recharging of the battery when the vehicle is stationary if the state of charge of the battery is below a critical threshold.

By contrast, the start-up of the stationary vehicle can be authorized with a prompt beforehand to recharge the battery when the vehicle is stationary if the state of charge of the battery is between the critical threshold and a safety threshold, which is higher than the critical threshold.

The invention also proposes the use of a specific interface dedicated to this management, by means of displayed signals and buttons, integrated for example in the dashboard.

Thus, the recharging of the battery can be activated when the vehicle is stationary, at the request of the driver acting on a dedicated interface.

Figure 2:
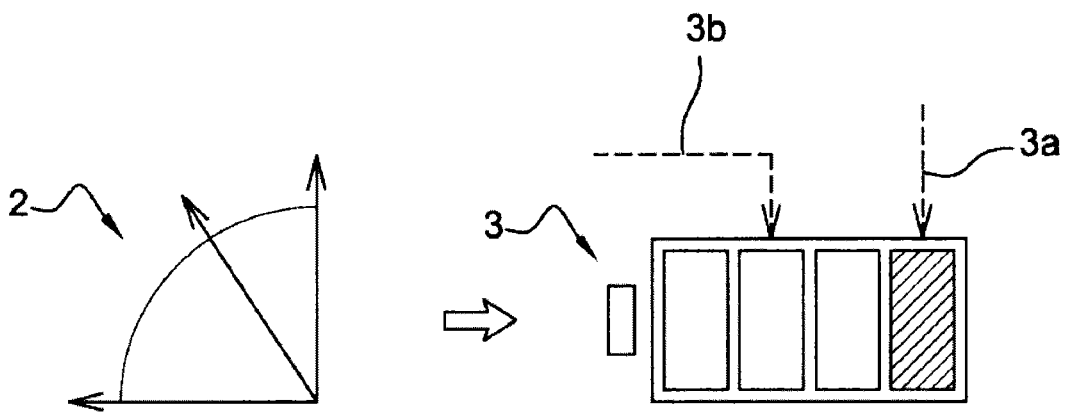
Figure 3:
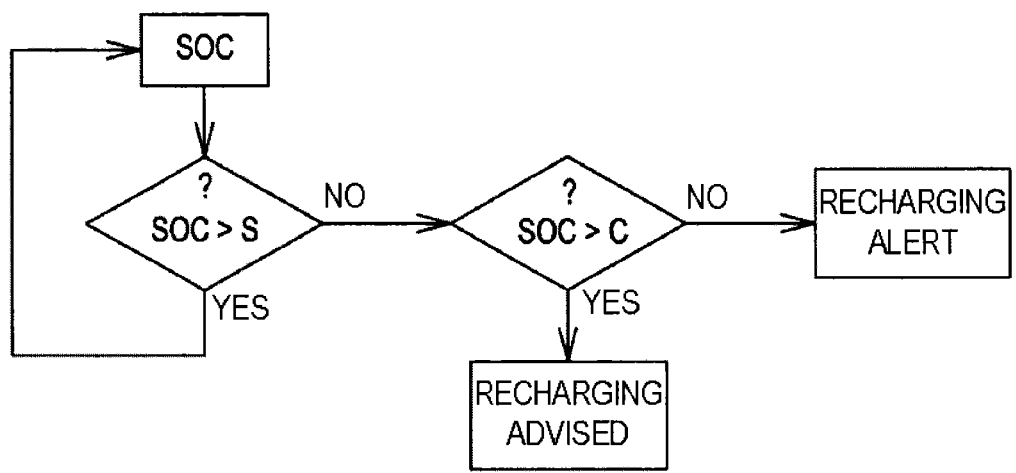
Figure 4:
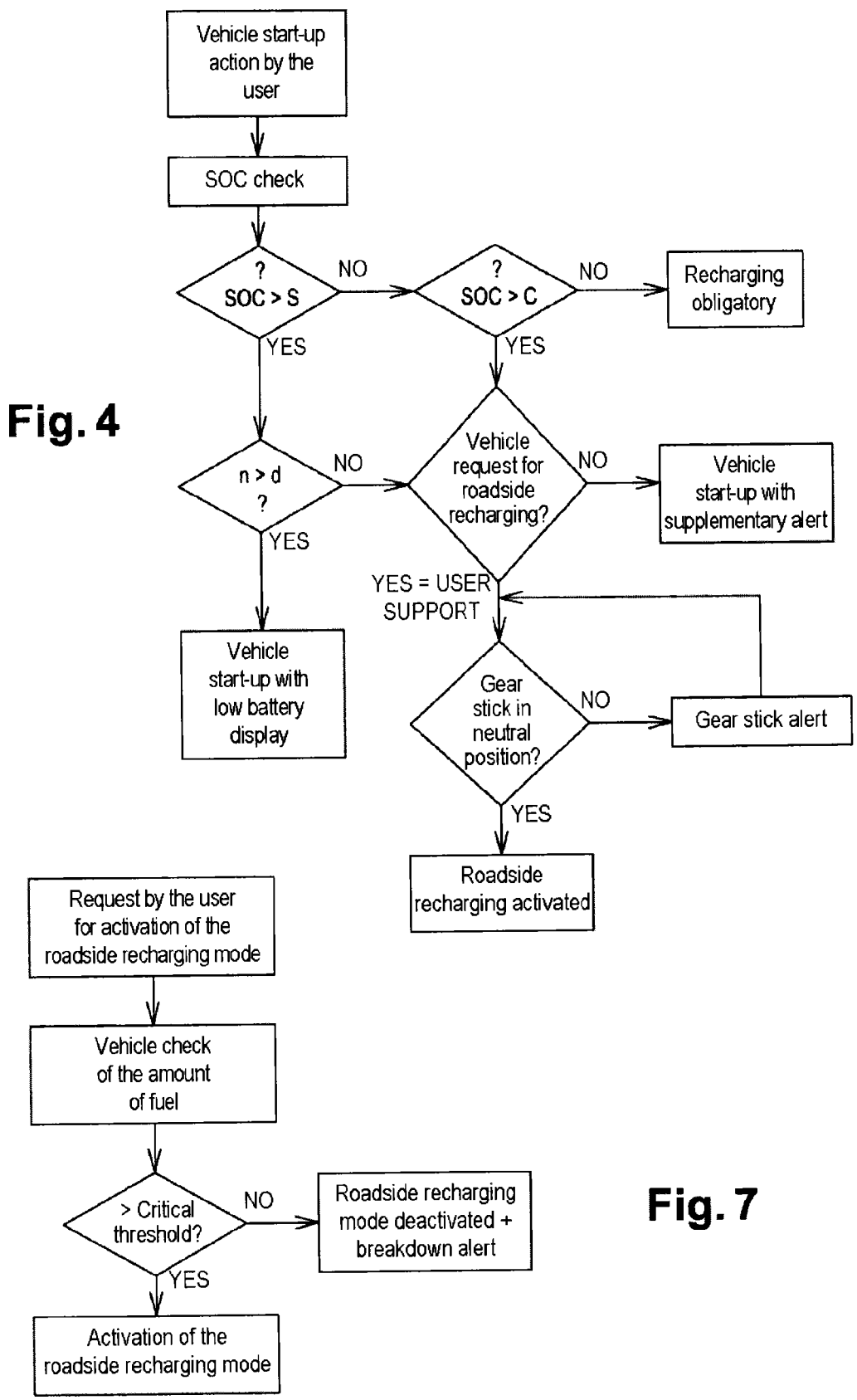
Figure 5:
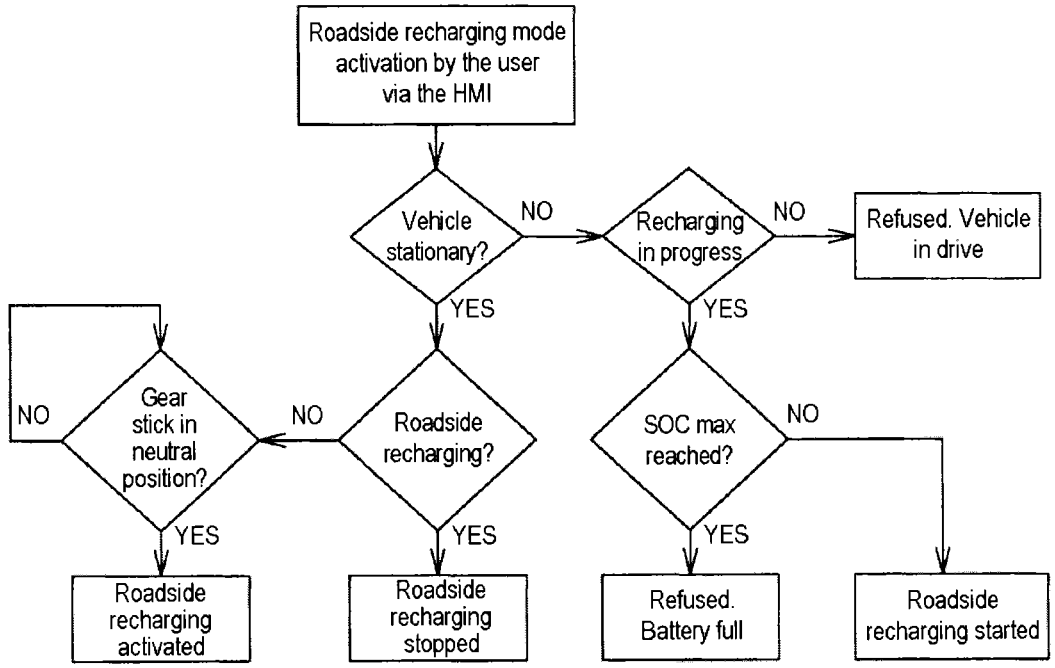
Figure 6:
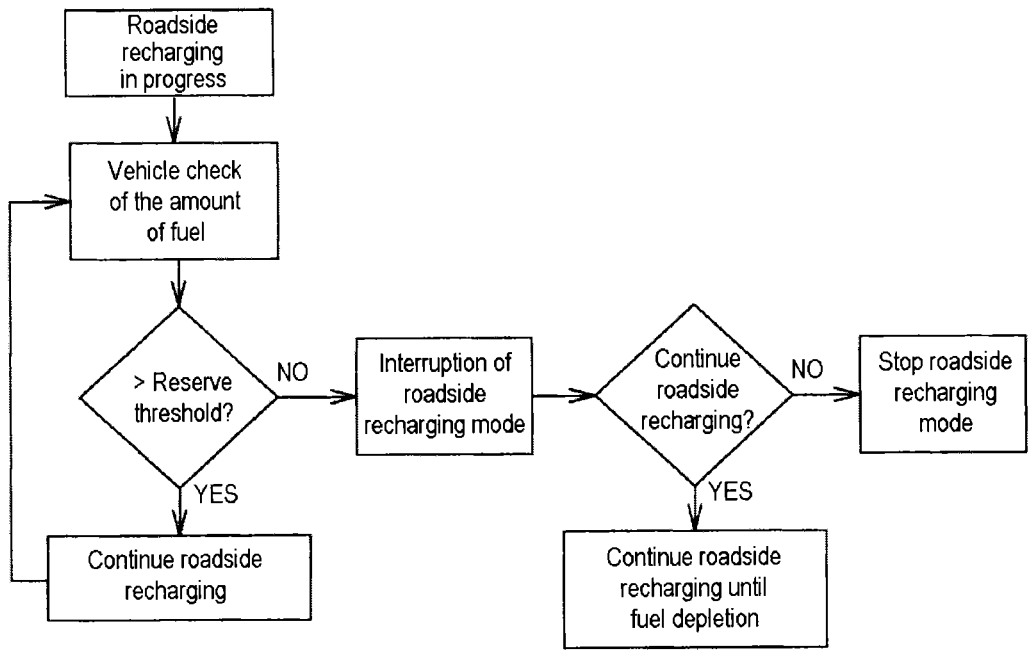

The present invention will be better understood upon reading the following description of a non-limiting embodiment thereof, with reference to the accompanying drawings, in which:

FIG. 1 shows a button for activating the recharging when the vehicle is stationary, FIG. 2 shows a visual interface,
FIG. 3 depicts the method during driving,
FIG. 4 depicts the method when the vehicle is stationary,
FIG. 5 shows forced activation,
FIG. 6 illustrates the management of the fuel, and
FIG. 7 introduces a critical fuel threshold.

The interaction means, such as the button 1, illustrated by FIG. 1, is dedicated to the management of an operating mode of the vehicle referred to as "roadside recharging", by means of which the driver has the option to select or to force the use of the heat engine as a generator in order to recharge his battery outside a driving cycle, that is to say when the vehicle is stationary. This button is located for example on the dashboard or close to the gear stick. Once engaged, the activation (or the interruption) of the recharging must be signaled by a message on the dashboard display and/or by the luminous contour of the button. Without departing from the scope of the invention, the interface, however, may be formed differently, for example by a touchscreen or a voice command, etc.

The recharging of the battery when the vehicle is stationary uses the heat engine combined with the electric motor, the electric motor functioning as a generator, as in a genset. The heat engine has a limited energy source, which is the amount of fuel available. As indicated in FIG. 2, this information can be taken into account and communicated to the driver via the interface 2. The information concerning the activation of the roadside recharging mode is thus supplemented by information concerning the fuel level (fuel gauge 2) and concerning the state of charge of the battery (battery state of charge gauge 3). These symbols show the user the actual state of charge of his battery 3a, the link between the state of charge of his battery and the amount of fuel available, and the maximum recharging 3b that can be implemented by consuming all the fuel in the tank.

In accordance with the invention, the recharging of the battery is activated in the following circumstances:
  either the control algorithms of the vehicle, on analysis of the input parameters thereof, signal the need to recharge the batteries of the vehicle (or alternatively the need to connect the vehicle to an available recharging terminal),
  or the user decides, on his own initiative, to force the recharging of the battery of the vehicle by means of a recharging when the vehicle is stationary.

In the first case, the parameters taken into account include the state of charge (or SOC) of the battery and the number of "move-off" phases that the vehicle could still perform with its batteries on the basis of the state of charge thereof. In the second case, the action of the user via the interface is decisive if certain safety conditions are met, such as the neutral or parking position of the gear stick, etc.

In any case, the recharging of the battery is only activated when the vehicle is stationary and therefore exclusively outside a driving cycle, at the request of the driver, and as a result of the driver acting on a dedicated interface, such as the button 1 in FIG. 1. Similarly, the deactivation of the recharging could be imposed at any moment by the user by an action on the interface, for example by pressing the same button again or by pressing another button. The recharging of the battery will also be interrupted automatically depending on the input parameters of the control algorithms of the vehicle.

The opportunity or need to activate or to deactivate the recharging of the battery when the vehicle is stationary is determined at least by the state of charge of the battery SOC and by the number of launches or "move-off phases" n in electric mode that the vehicle can perform on the basis of this state of charge. If, by design, the electric mode (without heat energy input) is imposed on the vehicle until a determined speed threshold (for example of 16 km/h), the heat engine cannot be started below this speed threshold: the number of "move-off phases" n in question corresponds to the number of possible launches of the vehicle from stationary start until the start-up of the heat engine.

The method also takes into account the electric energy that may be consumed during driving under various circumstances. If the traction battery (for example approximately 400 volts) is used to supply power to the vehicle equipment (headlights, radio, power supply of vehicle computers, etc.), it may discharge, even in heat mode. This consumption must therefore be taken into account. The same is true when the vehicle travels for a long time below the start-up threshold of the heat engine, for example in congested traffic.

In the flowchart in FIG. 3, the state of charge SOC of the battery is compared, during driving, with a safety threshold S and with a critical threshold C, which is lower than the safety threshold. Between the safety threshold and the critical threshold, that is to say S>SOC>C, the start-up of the stationary vehicle is authorized with a prompt beforehand to recharge the battery when the vehicle is stationary. The visual interface of FIG. 2 may indicate by means of a warning light that recharging when the vehicle is stationary is advised and may advise the driver to stop in order to recharge his batteries. Below the critical threshold, that is to say SOC<C, the start-up of the vehicle is refused without prior recharging of the battery when the vehicle is stationary. The interface may then signal the alert by indicating that recharging is necessary or obligatory. This may also be supported by an acoustic signal in order to signal the risk of immobilization of the vehicle.

When the vehicle is stationary and when the driver decides to use the vehicle, it is important to ensure, in all conditions, a certain number of move-off phases of the vehicle. It is thus necessary to ensure that the battery is above a certain charge threshold, for example the critical threshold or the safety threshold of FIG. 3. Depending on this state of charge and the number of move-off phases possible, the driver may receive a signal:

advising him to recharge: the vehicle can be started up, but the state of charge or the number of move-off phases is/are below the safety thresholds.

forcing him to recharge: the vehicle cannot be started up, the state of charge being insufficient (below the critical threshold) to allow the move-off phase.

The recharging can then be performed, either by connecting the vehicle to the mains connection or by activating the recharging mode when the vehicle is stationary, provided that safety conditions are met to authorize the recharging.

If the recharging has been advised or imposed on the driver by the control algorithms of the vehicle, it is automatically stopped when the charge guarantees a certain use of the vehicle, for example from a certain threshold, which may be between the critical threshold C and the safety threshold S mentioned above. The user still retains control of the recharging via the interface, and can interrupt it at any time. However, if the conditions for starting up the vehicle are still not met, the recharging alerts will not be interrupted.

In accordance with FIG. 4, when the driver takes action to start up the vehicle, the state of charge SOC of the battery is automatically checked. If it is greater than the safety threshold S, the number of authorized move-off phases n in electric mode is compared with a threshold d. If n>d, the start-up is authorized with display of "low battery". If SOC<C, the start-up is refused and recharging is obligatory.

The vehicle may advise recharging when the vehicle is stationary, either because the state of charge SOC is between the safety threshold S and the critical threshold C, or because the number of move-off phases is insufficient (n<d). If the driver requests recharging, he is warned if his gear stick is not in neutral, and recharging is not activated outside this position. The flow chart is not limiting, and other safety conditions can be checked prior to the actual start of the recharging.

Outside any alert or prompt of the vehicle, the driver retains the initiative to activate the recharging when the vehicle is stationary, for example in anticipation of a longer journey. As indicated in FIG. 5, the recharging is then activated at the driver's request, except if the vehicle is moving, if the battery is already fully charged, or if certain safety conditions are not activated. The driver can interrupt the recharging at any time via the interface, for example by pressing the button again.

As indicated above, the driver is informed during driving of the recharging capacity of the battery when the vehicle is stationary, and of the link between the amount of fuel available and the state of charge of the battery. The driver is thus aware of the progression of the recharging of the battery and of the decrease of the amount of fuel in the tank, and is also aware of the maximum recharging that he can perform by consuming all the fuel available in the tank. This information is particularly useful when driving in congested traffic, which does not authorize thermal propulsion.

The recharging of the battery is refused if a safety condition is not met or if the battery is already fully charged. Recharging is stopped automatically once the battery has been fully charged. As indicated in FIG. 6, the fuel tank has a reserve level, below which charging is interrupted automatically and a confirmation request is sent to the driver in order to authorize the consumption of the remaining amount of fuel in order to recharge the battery.

Lastly, as indicated in FIG. 7, it is useful to also provide a critical fuel level threshold, below which the amount of fuel available is insufficient to raise the level of charge (SOC) of the battery beyond the critical threshold (C). In this last case, the "roadside recharging" mode is deactivated and only conventional charging via mains connection will allow the battery to reach a level of energy sufficient for the vehicle to be mobile again.

The invention claimed is:

1. A method for controlling recharging of a battery of a hybrid vehicle when the hybrid vehicle is stationary, the hybrid vehicle including a heat engine and at least one electric machine that can simultaneously or independently generate movement of the hybrid vehicle in electric, thermal, and hybrid operating modes, according to driving conditions and a state of charge of a traction battery providing a power supply of the at least one electric machine, the method comprising:

receiving a command, based on a first request of a driver to a dedicated recharging interface to activate recharging of the battery using at least the heat engine, when the hybrid vehicle is stationary; and activating recharging of the battery using at least the heat engine when the hybrid vehicle is stationary, responsive to said receiving the command based on the first request of the driver to the dedicated recharging interface, wherein the recharging of the battery when the hybrid vehicle is stationary is interrupted below a reserve level of fuel in a tank, and resumed responsive to authorization from the driver that consumption of fuel below the reserve level is acceptable to recharge the battery.

2. The control method as claimed in claim 1, wherein a start-up of the hybrid vehicle is refused without prior recharging of the battery when the hybrid vehicle is stationary if the state of charge of the battery is below a critical threshold.

3. The control method as claimed in claim 1, wherein a start-up of the stationary hybrid vehicle is authorized with a prompt beforehand to recharge the battery when the hybrid vehicle is stationary if the state of charge of the battery is between a critical threshold and a safety threshold, which is higher than the critical threshold.

4. The control method as claimed in claim 3, wherein the start-up of the stationary hybrid vehicle is authorized with the prompt beforehand to recharge the battery when the hybrid vehicle is stationary if the state of charge of the battery is above the safety threshold, but a number of possible start-ups in electric mode with this state is below a determined threshold.

5. The control method as claimed in claim 1, wherein the recharging when the hybrid vehicle is stationary is only activated when a gear stick of the hybrid vehicle is in a neutral position.

6. The control method as claimed in claim 1, wherein the driver is informed during driving of a need to stop the hybrid vehicle to recharge the battery if the state of charge is below a critical threshold.

7. The control method as claimed in claim 1, wherein the driver is prompted during driving to stop the hybrid vehicle to recharge the battery if the state of charge is between a safety threshold and the critical threshold.

8. The control method as claimed in claim 1, wherein the recharging of the battery is refused when the battery is already fully charged, or is stopped automatically once the battery is fully charged.

9. The control method as claimed in claim 1, wherein the recharging of the battery when the hybrid vehicle is stationary is deactivated when an amount of fuel available in the tank of the hybrid vehicle is insufficient to raise the state of charge of the battery beyond a critical threshold.

10. The control method as claimed in claim 1, wherein the recharging of the battery also uses said at least one electric machine.

11. The control method as claimed in claim 1, further comprising deactivating the recharging of the battery, prior to the battery reaching a fully charged state, in response to a second request of the driver to the dedicated recharging interface.

* * * * *